(12) United States Patent
Hassanzadeh et al.

(10) Patent No.: US 10,943,107 B2
(45) Date of Patent: *Mar. 9, 2021

(54) SIMULATING IMAGE CAPTURE

(71) Applicant: INTUIT INC., Mountain View, CA (US)

(72) Inventors: Kimia Hassanzadeh, Edmonton (CA); Richard J. Becker, Alberta (CA); Cole MacKenzie, Edmonton (CA); Gregory Kenneth Coulombe, Edmonton (CA)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,907

(22) Filed: Oct. 2, 2019

(65) Prior Publication Data
US 2020/0034613 A1 Jan. 30, 2020

Related U.S. Application Data

(63) Continuation of application No. 15/648,513, filed on Jul. 13, 2017, now Pat. No. 10,474,890.

(51) Int. Cl.
G06K 9/66 (2006.01)
G06K 9/00 (2006.01)
G06K 9/18 (2006.01)
G06T 7/70 (2017.01)
G06T 15/20 (2011.01)
(Continued)

(52) U.S. Cl.
CPC ..... *G06K 9/00463* (2013.01); *G06K 9/00442* (2013.01); *G06K 9/18* (2013.01); *G06K 9/36* (2013.01); *G06K 9/66* (2013.01); *G06T 7/70* (2017.01); *G06T 15/00* (2013.01); *G06T 15/20* (2013.01); *G06K 2209/01* (2013.01); *G06T 2207/30244* (2013.01)

(58) Field of Classification Search
CPC combination set(s) only.
See application file for complete search history.

(56) References Cited

U.S. PATENT DOCUMENTS 7,463,772 B1 * 12/2008 Lefevere .............. G06K 9/3283
345/419
8,156,116 B2 * 4/2012 Graham ............. G06Q 30/0241
707/728

(Continued)

FOREIGN PATENT DOCUMENTS

WO 2017060850 A1 4/2017

*Primary Examiner* — Tsung Yin Tsai
(74) *Attorney, Agent, or Firm* — Patterson & Sheridan, LLP

(57) ABSTRACT

The present disclosure relates to simulating the capture of images. In some embodiments, a document and a camera are simulated using a three-dimensional modeling engine. In certain embodiments, a plurality of images are captured of the simulated document from a perspective of the simulated camera, each of the plurality of images being captured under a different set of simulated circumstances within the three-dimensional modeling engine. In some embodiments, a model is trained based at least on the plurality of images which determines at least a first technique for adjusting a set of parameters in a separate image to prepare the separate image for optical character recognition (OCR).

20 Claims, 6 Drawing Sheets

(51) Int. Cl.
    *G06K 9/36*         (2006.01)
    *G06T 15/00*     (2011.01)

(56)           References Cited

U.S. PATENT DOCUMENTS

| | | | |
|---|---|---|---|
| 8,855,375 B2* | 10/2014 | Macciola | H04N 1/387 |
| | | | 382/112 |
| 9,588,651 B1* | 3/2017 | Buchanan | G06F 3/04815 |
| 2008/0175507 A1* | 7/2008 | Lookingbill | G06K 9/228 |
| | | | 382/255 |
| 2009/0067726 A1 | 3/2009 | Erol et al. | |
| 2011/0255782 A1* | 10/2011 | Welling | G06K 9/00442 |
| | | | 382/173 |
| 2017/0060850 A1 | 3/2017 | Lewis et al. | |
| 2018/0336415 A1* | 11/2018 | Anorga | G06K 9/00671 |
| 2019/0019021 A1* | 1/2019 | Hassanzadeh | G06T 7/70 |

\* cited by examiner

SIMULATING IMAGE CAPTURE

CROSS-REFERENCE TO RELATED APPLICATIONS

This Application is a continuation of and hereby claims priority under 35 U.S.C. § 120 to pending U.S. patent application Ser. No. 15/648,513, filed on Jul. 13, 2017, the contents of which are incorporated herein in their entirety.

BACKGROUND

Field

Embodiments presented herein generally relate to simulated image capture, and more specifically to simulating the capture of images for use in training models to extract information from images.

Description of the Related Art

Data processing and exchange are essential for a variety of businesses and personal transactions. For example, small businesses use accounting and inventory data to obtain and share reports regarding inventory sales, customer invoices, or cash flow. Similarly, healthcare providers examine medical records to view patient information related to insurance providers, medical conditions, or office visits.

In addition, data exchange frequently relies on document exchange including electronic versions of documents such as word-processing documents, spreadsheets, or Portable Document Format (PDF) documents and paper documents (e.g., which may be generated electronically). For example, a business may manage business transactions with a set of customers by creating a set of bills, invoices, or other types of documents containing data associated with the business transactions and sending the documents to the respective customers. The customers use the data in the documents to pay the bills or invoices, respond to the business, or update their records of the transactions. Similarly, companies, banks, and mortgage companies may provide several tax documents (e.g., W-2, 1099-Int, etc.) to employees and customers as needed to file their tax returns, for example, by using commercially available income tax preparation software.

Optical character recognition (OCR) systems are generally used to detect text present in an image of a document (e.g., a tax document) and to convert the detected text into a machine readable representation. Digital cameras and mobile devices are becoming increasingly popular for document image acquisition in the world of optical character recognition and text recognition. In order for a conventional OCR engine to accurately recognize text in an image, the image typically needs to be of a high quality. However, images produced, for example, using digital cameras and other mobile devices may include many distortions and may produce images of poor quality. The quality of an image depends on various factors including quality of camera used to produce the image, power of the lens, resolution, light intensity, relative motion between the camera and the text document, level of focus, background (including back lighting, and the like), and the quality of the actual text document. Thus, an image produced using such a device may include various forms of distortion including blur, skew, rotation, shadow marks, and other forms of distortion. As a result, a computing device performing optical character recognition on an image of a given document may have difficulty extracting information from the document for use by other applications (e.g., a tax preparation application).

In order to improve OCR techniques, some solutions make use of existing images as reference data. Conventional systems attempt to obtain as many source images as possible (e.g., test images captured specifically to be used as reference data and images captured by customers in previous OCR operations), do a crude subjective categorization, and then determine accuracy of OCR with respect to a candidate image based on the source image set. However, conventional systems have access to a very limited source image set, due to the difficulties associated with acquiring reference images (e.g., the resources required to manually capture images specifically for the purpose of being used as reference images, the effort required to redact confidential information from images captured by users, etc). The limited image set tends to bias the results of image processing, since the analysis tends to be focused on the incidental characteristics of the images available in the image set. There is generally little opportunity to discern the specific characteristics that affect accuracy or degrade OCR. Providing raw images does not allow for the isolation of very specific image characteristics that may affect OCR accuracy, and subsequently the ability to tune or adjust for those anomalies in the image.

Furthermore, images previously captured by customers may contain confidential information and may therefore require manual pre-processing steps (e.g., by clerks) in order to redact information before the images are delivered to data scientists to be used as reference data. This process is inefficient, and the resulting images may be less valuable as reference data due to the redactions, which introduce noise into the images. As such, gathering a large amount of images to be used as reference data for the purpose of improving OCR techniques is challenging.

SUMMARY

One embodiment of the present disclosure includes a computer-implemented method for simulating the capture of images. The method generally includes simulating a document and a camera using a three-dimensional modeling engine. The method further includes capturing a plurality of images of the simulated document from a perspective of the simulated camera, each of the plurality of images being captured under a different set of simulated circumstances within the three-dimensional modeling engine. The method further includes training a model based at least on the plurality of images, wherein the trained model determines at least a first technique for adjusting a set of parameters in a separate image to prepare the separate image for optical character recognition (OCR).

Another embodiment of the present disclosure includes a processor and a memory storing a program, which, when executed on the processor, performs the method for simulating the capture of images.

Still another embodiment provides a non-transitory computer-readable storage medium having instructions, which, when executed on a processor, performs the method for simulating the capture of images.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be

DETAILED DESCRIPTION

Figure 1:
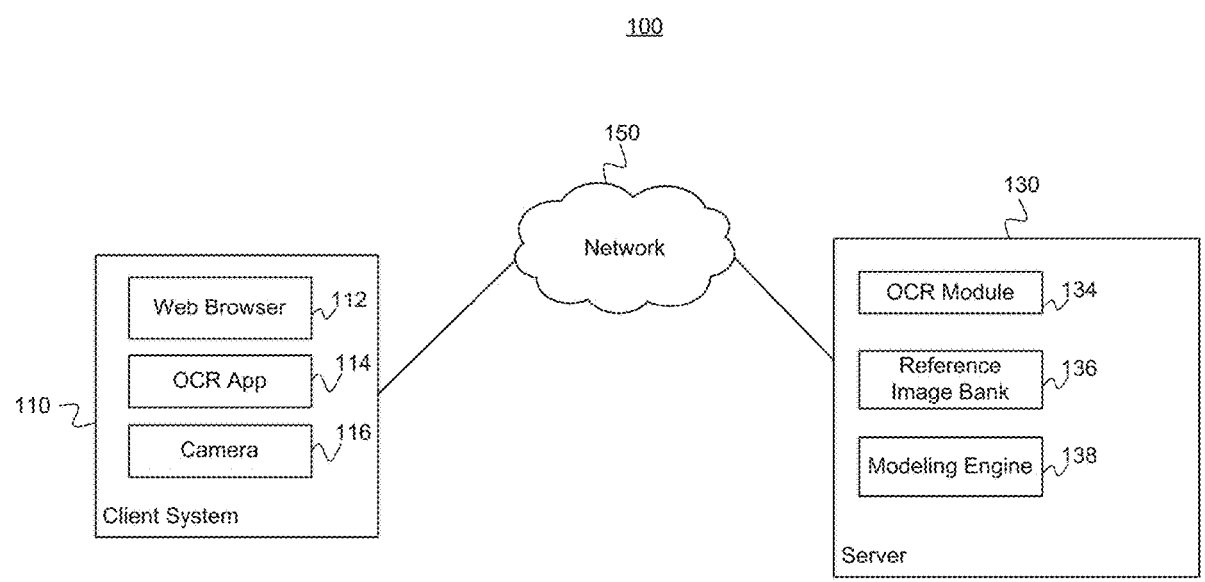
FIG. 1 illustrates an example computing environment in which certain embodiments of the present disclosure may be implemented.

Embodiments presented herein provide techniques for assessing and improving quality of images of documents for optical character recognition (OCR) based on simulated reference images. Traditionally images are obtained from various sources (e.g., captured by a user of a mobile application) and subjectively evaluated to determine the viability of the images for OCR using a very limited source image set. When dealing with a small number of devices with a limited set of image capture conditions and related operational parameters, it may be effective to optimize the images using the traditional optimization techniques. However, these traditional techniques are not scalable and do not provide the operational parameters that affect image quality.

According to embodiments of the present disclosure, a three-dimensional modeling engine is used to simulate capturing a plurality of images of particular types of documents under a variety of simulated circumstances. The images may be used to train a computer model (e.g., a machine learning (ML) model, deep learning (DL) model, or convolutional neural network (CNN)) which determines optimal OCR techniques for extracting information from an image under a given set of circumstances. Because the images are captured within a simulated environment, a potentially limitless amount of images may be generated, and the characteristics of the images may be fine-tuned within the simulated environment in order to focus on the effects which particular combinations of characteristics (e.g., lighting, shadows, camera position, background, and noise) have on the OCR process. Once the computer model has been trained using the reference images, it is used to determine the operational parameters affecting the quality of an image, and determine how and to what extent the determined parameters are to be adjusted to improve the quality of the image to acceptable levels for OCR. The techniques also include determining whether or not an image may be optimized for OCR.

In some cases, data may be included in a document such as a word-processing document, spreadsheet, Portable Document Format (PDF) document, web page, paper document or another type of formatted document containing structured or semi-structured data. For example, the document may be a bill, invoice, form, statement, transcript, record, receipt, tax document (e.g., W-2, 1099-Int, 1099-Dive, consolidated brokerage statement, 1040, 1040A, 1040EZ, Schedule A, Schedule C), or other type of document that includes a specific type or set of data without adhering to a strict layout or format for showing the data. Further references to "document" in the following description include all forms of documents noted above.

Optical character recognition (OCR) systems are generally used to detect text present in an image of a document (e.g., a tax document) and to convert the detected text into its equivalent electronic representation for use in certain applications (e.g. tax applications).

Easy access to computing devices including personal computers (PCs) and portable computing devices (e.g., smart phones) and plentiful network bandwidth have made these computing devices very popular for sharing and processing data. For instance, users may easily download and execute a range of applications on their computing devices such as PCs, tablets, and smartphones to process and share data. Factors such as larger screen sizes, increased computational capabilities, and inherent portability and convenience have made such devices the favorite computing platform of many users.

These computing devices generally include or support camera devices that may be used to capture images of documents (e.g., tax documents) for OCR of data (e.g., text and non-text) included in the documents. In order for an OCR engine to accurately recognize text in an image, the image typically needs to be of a high quality. However, digital cameras and other devices may produce images of poor quality that include many distortions. An image produced using such a device may include various forms of distortion including blur, skew, rotation, shadow marks, and other forms of distortion. Each image is associated with a combination of these parameters and a quality of the image is generally dictated by the values each of these parameters take. Each of these parameters typically has a base value representative of an ideal or close to ideal value and any deviation from this value may adversely affect the quality of an image with respect to the parameter. Generally, a larger deviation from the base value of a parameter leads to a larger distortion of the image with respect to the parameter.

Thus, an image generally needs to be processed to optimize parameters which contribute to image distortion and to improve image quality for subsequent OCR. In some cases, determining the quality of an image and determining the operational parameters of an OCR system is difficult due to the factors discussed above. This difficulty is further compounded when the number of potential sources of the images and the various operational parameters these sources contribute associated with quality of an image are considered. For example, mobile devices may be associated with parameters including differing operating systems, cameras, versions, on-device image processing, and the like. Scanners may be associated with parameters including resolution, gamuts, feed quality, and the like. PC cameras may be associated with parameters including resolutions, image framing, quality, and the like. Each of these parameters associated with an image can be determined and optimized to increase the quality of the image for OCR.

Further, various methods may be used to adjust each parameter or a combination of parameters associated with the quality of an image in order to improve the quality of the image. For example, binarization is a method that is used to turn a color image into a black and white image. Different techniques may be used to perform binarization of an image.

Each of these techniques may further include various parameters that may affect and alter the result of the binarization. Those parameters can be optimized to ensure the binarization increases the quality of the image for OCR purposes.

Traditionally images are obtained from the various sources discussed above and subjectively evaluated to determine the viability of the images using a very limited source image set. For example, if a particular technique of binarization generally achieves good results for a number of images, the technique is chosen and used for all images. Thus, the binarization technique and associated parameters are not optimized for each image.

In certain aspects, a computing device may be configured to simulate one or more reference images of documents using a three-dimensional modeling engine. The three-dimensional modeling engine may be used to simulate a document and a camera within a simulated environment, and images of the simulated document may be captured from the perspective of the simulated camera within the simulated environment. In an aspect, each of the images represents a high-quality digital representation of the document within the simulated environment in which values of parameters associated with the quality of the document are within known ranges. The documents may correspond to different structured or semi-structured documents, e.g., tax forms.

In computer graphics and animation, a simulated or virtual camera refers to a function of the rendering engine that determines what would be seen through a camera disposed at a specific position and in a specific orientation (e.g., pointing in a specific direction) within a 3D environment. The position and orientation may sometimes be referred to collectively as the pose of the virtual camera. The pose of the virtual camera can be defined by one or more parameters, such as x, y, and z coordinates for position and pitch θ, roll ϕ, and yaw ψ parameters defining rotation angles about y-axis, the x-axis, and the z-axis, respectively, in a rectangular coordinate system. The parameters may also be defined using other types of coordinates, such as spherical coordinates or cylindrical coordinates.

As the computing device knows the contents of the simulated document within the simulated environment, as well as the values of the characteristics (e.g., lighting, background, camera pose) of each simulated image, it may determine whether a particular adjustment of operational parameters results in a successful OCR operation. Thus, this technique provides the operating parameters and provides a correlation of the parameters to accuracy under a given set of circumstances for a particular document type. The simulated images and other information including the information relating to the characteristics (e.g., lighting, background, camera pose) of the simulated images, the operational parameters, and accuracy of the image analysis is used to train a computer model (e.g., ML, DL, CNN).

In certain aspects, when a client image of a candidate document is presented to the computing system, the computing device, based on the trained computer model, determines a set of parameters that need to be adjusted and by what amounts these parameters need to be adjusted (e.g., to bring the parameter values within acceptable ranges) in order to improve the quality of the image for OCR. The computer model (or another process of the computing system) further determines one or more techniques (e.g., techniques for binarization, rotation, de-skew, keystone correction, etc.) for adjusting the determined parameters by the determined amounts. In certain aspects, the computing system, based on the trained computer model, may determine whether or not the quality of the client image may be improved to an acceptable level for OCR. If not, the client image may be discarded and the client may be asked to capture another image of the candidate document.

Different aspects of these techniques are described in more detail herein, along with additional examples of how the techniques may be used to assess and improve image quality to perform OCR.

FIG. 1 illustrates an example computing environment 100 in which certain embodiments of the present disclosure may be implemented. As shown, the computing environment 100 includes client system 110 and a server 130, each connected to a network 150. The network 150, in general, may be a wide area network (WAN), local area network (LAN), wireless LAN (WLAN), personal area network (PAN), a cellular network, or any other technology that allows devices to communicate electronically with other devices. In a particular embodiment, the network 150 is the Internet.

Client system 110 is included to be representative of a general purpose computing system hosting software applications that may be installed and run locally or may be used to access applications running on the server 130. The client system 110 may include mobile computing systems including smart phones, tablet computers, laptop computers, or any other mobile computing devices or systems capable of running software applications, capturing images, and communicating over a network (e.g., the Internet). In an aspect, client system 110 includes non-mobile computing devices such as desktop computers or other non-mobile computing devices capable of capturing images and communicating over a network (e.g., the Internet). As shown, client system 110 includes web browser 112 used to access the server 130 by rendering web pages (e.g., generated by the OCR module 134) or running applications which are hosted on the server 130. In certain aspects, the web browser 112 may include mobile versions of the web browser 112 when the client system 110 is a mobile computing system such as a smart phone or a tablet computer. The client system 110 includes an OCR app 114. The OCR app 114 may be a local application that is installed and run locally on the client system 110. In certain aspects, the OCR app 114 may be representative of a component of a client server application (or other distributed application) which can communicate with the server 130 over network 150. For example, OCR app 114 may be a "thin" client where the processing is largely directed by the OCR app 114, but performed by computing systems of the server 130 or a software application installed on client system 110. The client system 110 may further include a camera 116 for capturing images. The client system 110 may also include other devices that may be used for image capturing, for example, a digital scanner (not shown).

As shown, the server 130 includes an OCR module 134 that may run locally on the server 130. Further, the OCR module 134 may be accessed and executed by devices on the network 150, such as the client system 110. The OCR module 134, for example, may generate web pages that are rendered by a browser such as browser 112. In another example, OCR module 134 may be accessed by or work along with client-side applications, such as OCR app 114 as discussed.

In certain aspects, the OCR app 114 and the OCR module 134 may be used (in conjunction with modeling engine 138, which is described below) to implement the techniques for facilitating information identification in a document in accordance with aspects of the present disclosure. For example, the OCR module 134 may perform an offline (e.g., prior to run-time) process including obtaining high quality reference images from modeling engine 138 corresponding to various documents under various simulated circumstances, determining accuracy of OCR after particular changes to parameters of the images, and training a computer model (e.g., ML, DL, CNN) using the reference images and information regarding the simulated circumstances of the images, the types of documents, the parameter changes, and the determined accuracy of detection.

OCR app 114 may start a run-time process by obtaining a client image of a candidate document. The OCR module 134 at the server 130 may receive the obtained client image from the client system 110 over the network 150, determine a set of parameters that are to be adjusted, and determine by what amounts the determined parameters are to be adjusted based on the trained computer model. The OCR module 134 may also determine one or more techniques to be used for adjusting the determined parameters by the determined amounts for improving the quality of the client image (e.g., optimize the client image) for OCR. The OCR module 134 may process the client image by adjusting the determined parameters by the determined amounts to improve the quality of the client image for OCR. In an aspect, the results of analyzing the client image based on the trained computer model (e.g., determined parameters, adjustment values, and adjustment techniques) may be communicated to the client system 110 and the client image may be adjusted by the OCR app 114 based on the received results.

The run-time process may further include performing OCR on the optimized client image. In an aspect, the OCR is performed by the OCR app 114 at the client system 110. In an alternative aspect, the OCR is performed by the OCR module 134 at the server 130 and the results of the OCR are communicated to the client system 110. The run-time process may also determine whether a client image is viable or not for OCR recognition. If not, the client image may be discarded and the client system 110 or the mobile device 120 may be directed to capture another image of the candidate document. In an aspect, this step is performed by the OCR module 134 at the server 130 and the results including whether or not the client image is viable for OCR are communicated to the client system 110.

In certain aspects, the client image of the candidate document may be obtained by capturing the image of the document using the camera 116 of the client system 110 or another image capturing mechanism available at the client system 110. In an aspect, the image of the candidate document may include an electronic version of the candidate document (e.g., in PDF format, Microsoft Word format etc.).

In certain aspects, the offline processing and run-time processing may be performed independently by the OCR app 114 and the OCR module 134 or may be distributed over the OCR app 114 and the OCR module 134 as discussed above. For example, if the client system 110 includes a relatively powerful computing system, one or more processing steps of the offline and run-time processes may be carried out by the client system 110. However, if the client system is a mobile computing system with limited processing capabilities, most of the offline and run-time processing may be carried out at the server 130.

As shown, the server 130 further includes a reference image bank 136. In certain embodiments, reference image bank 136 comprises a data store (e.g., a database) which comprises a plurality of reference images used by OCR module 134 to train the computer model. Reference images stored in reference image bank 136 may be received from various sources, such as modeling engine 138 (e.g., simulated images), client system 110 (e.g., images captured by users of tax applications), or from OCR module 134 (e.g., images fed back into reference image bank 136 after OCR operations are performed). In an aspect, reference images include electronic versions of one or more documents (e.g., in PDF format, Microsoft Word format etc.).

As shown, the server 130 further includes a modeling engine 138. According to certain embodiments, modeling engine 138 comprises a 3D modeling engine which simulates the capture of images of documents from the perspective of a simulated camera within a simulated environment. For example, the simulated environment may comprise a complicated representation of a 3D environment, such as a stereolithography (STL) file, an object (OBJ) file, or a set of files (e.g., where geometry, texture, lighting, shadows, and other details are simulated and stored in separate associated files). The simulated environment may also include elements that can move, bend, stretch, or change in other ways over time within the 3D environment. In some embodiments, modeling engine 138 provides accurate ray tracing, and allows for the simulation of common circumstances in which users take snapshots of documents using mobile devices under different light-exposures and camera angles. Documents which are simulated within the simulated environment may comprise a plurality of different types of documents (e.g., tax documents such as W-2 and 1040 forms), and may be arranged within the simulated environment as they might be arranged by a user attempting to capture a photo of a document in the real world. For example, a document may appear to rest on a simulated surface within the simulated environment, and a simulated camera may be situated above the document in order to capture an image of the document within the simulated environment.

Modeling engine 138 may simulate the capture of a plurality of images of each of a plurality of document types from different perspectives and under different simulated circumstances. For example, for a particular type of document, modeling engine 138 may capture a series of images of the document from the perspective of a simulated camera under different combinations of lighting, background, and camera pose. Modeling engine 138 may store information identifying the simulated circumstances and document type in each image, and may provide this information along with the images to OCR module 134 to train the computer model. Modeling engine 138 may also store the simulated images in reference image bank 136. In some embodiments, modeling engine 138 does not provide the images directly to OCR module 134, but only stores them in reference image bank 136. Once the images have been stored in the reference image bank 136, OCR module 134 retrieves the images from reference image bank 136 to train the computer model.

Figure 2:
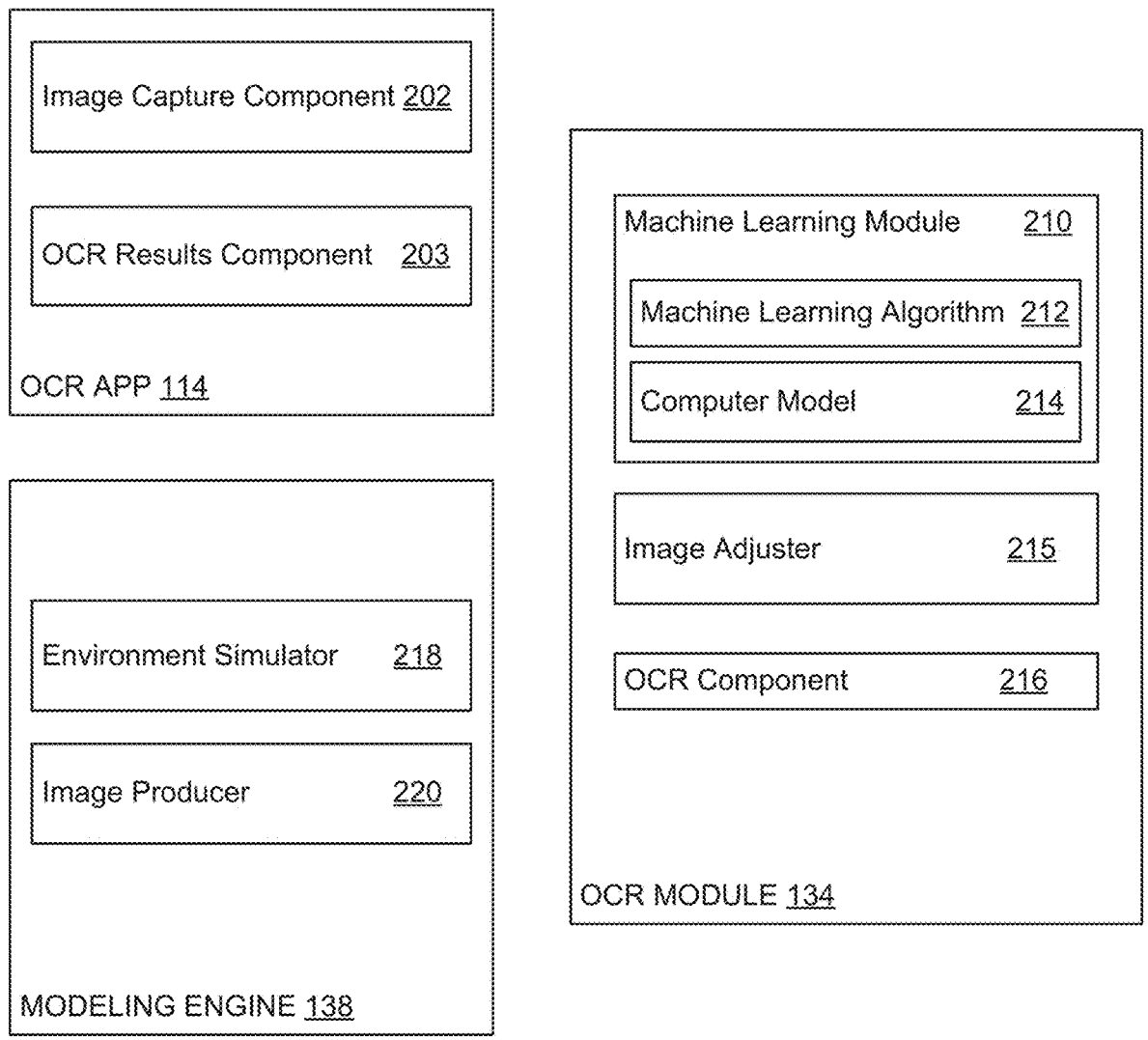
FIG. 2 illustrates an OCR app, an OCR module, and a modeling engine in accordance with certain aspects of the present disclosure.

FIG. 2 illustrates an OCR app 114, an OCR module 134, and a modeling engine 138, in accordance with certain aspects of the present disclosure. As shown in FIG. 2, OCR app 114 includes an image capture component 202 and an OCR results component 203. The OCR module 134 includes a machine learning module 210, an image adjuster 215, and an OCR component 216. The machine learning module 210 further includes machine learning algorithm 212 and a computer model 214. The modeling engine 138 includes an environment simulator 218 and an image producer 220.

At the OCR app 114, the image capture component 202 controls an image capture device (e.g., camera 116 of client system 110 of FIG. 1) to obtain images of a document. In certain aspects, the images captured by the image capture component 202 may include client images to be processed for carrying out OCR as part of run-time processing or reference images used to train a computer model (e.g., computer model 214) as part of offline processing as discussed above. In an aspect, the images captured by the image capture component 202 are sent (e.g., over the network 150) to the OCR module 134 for further processing.

The OCR module 134 may obtain reference images of a particular document from a local storage (e.g., reference image bank 136) or a storage server over a network (e.g., network 150) or from modeling engine 138. OCR module 134 may use reference images, along with associated information about the characteristics of the reference images, to train the computer model 214 of machine learning module 210.

The machine learning module 210 includes a machine learning algorithm 212 that trains a computer model 214 using the reference images and information regarding the characteristics of the reference images. For example, machine learning algorithm 212 may adjust parameters of an image (e.g., blur, skew, rotation, shadow marks, brightness, contrast, saturation, etc.), perform OCR on the image, and determine whether the OCR accurately identified text present in the image based on information known to be in the image (e.g., based on a baseline version of the image). Once a successful combination of parameter adjustments has been identified, these parameter adjustments may be stored in computer model 214 in association with the document type (e.g., W-2 form) and the image characteristics (e.g., lighting, background, camera pose, etc.), so that future images of the same document type and similar characteristics may be handled similarly by machine learning module 210.

At run-time, the trained computer model 214 accepts client images (e.g., client images captured by the image capture component 202 and received from the OCR app 114 over network 150), determines a set of parameters that are to be adjusted, and determines by what amounts the determined parameters are to be adjusted. The trained computer model 214 further determines one or more techniques to be used for adjusting the determined parameters by the determined amounts for improving the quality of the client image for OCR. The trained computer model 214 also determines whether a client image is viable or not for OCR (e.g., based on whether or not the values of certain image parameters or characteristics are within an acceptable range). If not, the image capture component 202 may be directed to capture another image of the candidate document (e.g., a user may be notified in OCR app 114 that the image must be recaptured).

The image adjuster 215 adjusts a client image by adjusting the determined parameters by the determined amounts to improve the quality of the client image for OCR.

The OCR component 216 evaluates the adjusted/optimized client images to identify what text or numeric content is depicted in the images. The results of the OCR including the identified text and numeric content are sent to the OCR results component 203 at the OCR app 114 for use by one or more applications (e.g., tax related applications) at a client system (e.g., client system 110 of FIG. 1).

The modeling engine 138 includes an environment simulator 218 and an image producer 220. The environment simulator 218 simulates an environment in which a simulated camera captures images of a simulated document under a particular set of simulated circumstances. For example, environment simulator 218 may generate a 3D environment which includes background objects, a document of a particular type (e.g., a W-2 form), and a simulated camera, and may include such characteristics as lighting and shadows. Lighting may be simulated by the inclusion of one or more light sources in the simulated environment. For instance, a simulated environment may comprise an office, where a tax document rests on a desk and light comes from a window and an overhead light fixture within the simulated office. Environment simulator 218 may simulate real-life details, such as shadows cast by objects in the office based on the positioning and brightness of light sources. The document may include dummy information (e.g., generic values for each field within a W-2 form). In some embodiments, the contents of the simulated document may be based on an actual image of a document (e.g., client images captured by the image capture component 202 and received from the OCR app 114 over network 150). The simulated camera within the simulated environment may be used as a perspective from which to capture images of the document.

Image producer 220 may generate images by simulating the capture of images within environment simulator 218. For example, image producer 220 may produce a series of images of a particular type of document within various simulated environments, from a variety of different simulated camera poses, and under a variety of different simulated circumstances. In some embodiments, image producer may simulate the capture of images by various different camera types (e.g., the embedded cameras in particular models of phones) and lens types. The generated images may be provided by modeling engine 138 to OCR module 134, along with information relating to the circumstances of the images (e.g., the document type, the textual contents of the document, lighting, background, camera pose, etc.), so that they may be used to train the computer model 214.

Figure 3:
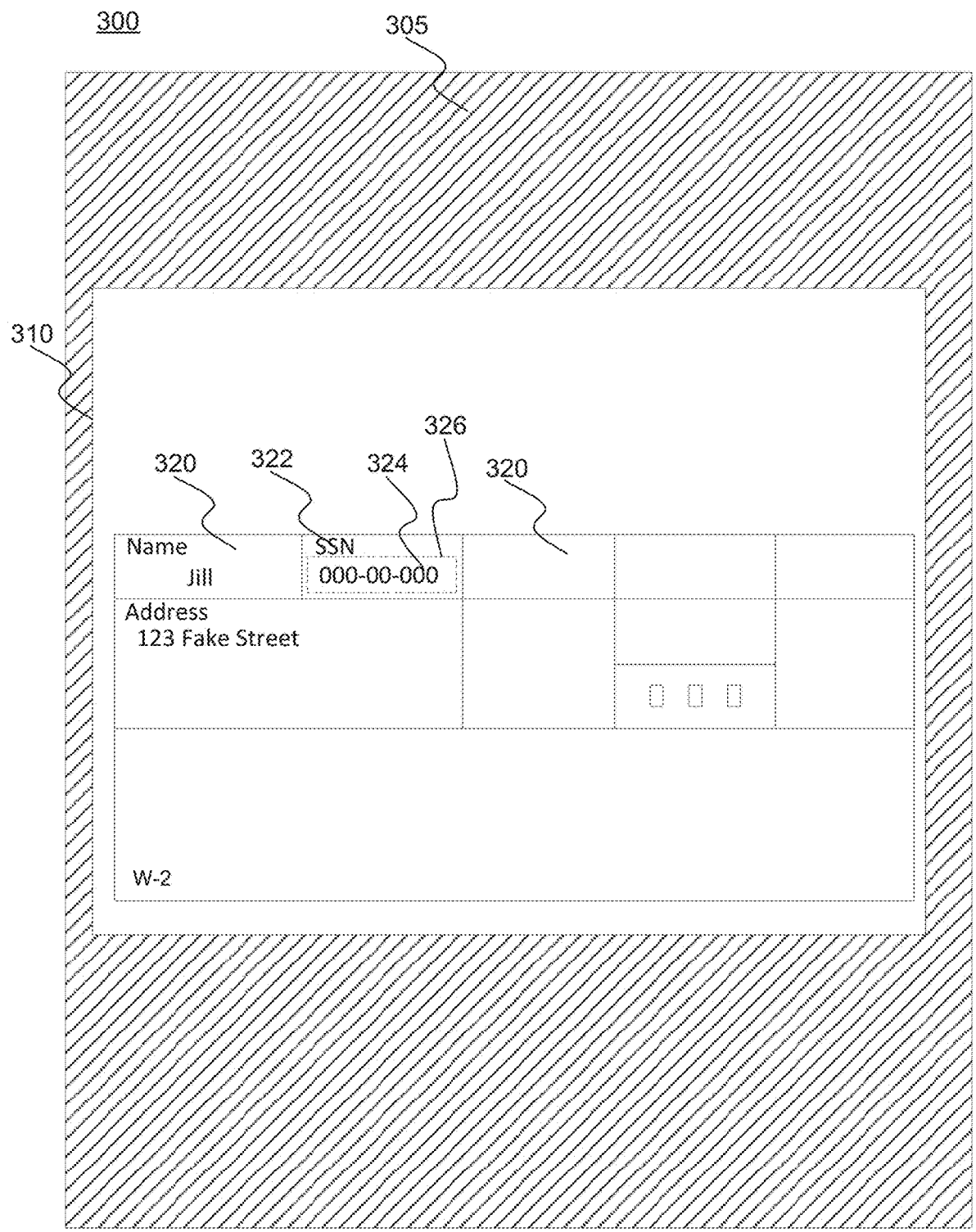
FIG. 3 illustrates an example electronic image including a document 310, in accordance with certain aspects of the present disclosure.

FIG. 3 illustrates an example electronic image 300 including a document 310, in accordance with certain aspects of the present disclosure. In the embodiment shown, the electronic image 300 includes the document 310 in a portion of the electronic image 300, as well as other background imagery 305. For example, the electronic image 300, as shown, may correspond to a client image of the document 310 captured using an image capture device (e.g., camera of a mobile device) and include the background imagery 305 (e.g. the physical surface upon which the document is placed by a customer, so that the customer can acquire an image of the document with her/his device camera). Alternatively, the electronic image 300 may correspond to a simulated image of the document 310 generated by modeling engine 138 from the perspective of a simulated camera within a simulated environment, and include the background imagery 305 (e.g. the simulated physical surface upon which the document rests in the simulated environment). In some other embodiments, the electronic image 300 may not include any background imagery 305. For example, the electronic image 300 may correspond to a high quality electronic version of the document 310 and may be used as a reference image.

In certain aspects, a client image (e.g., image 300) of a candidate document (e.g., document 310) captured using a camera device (e.g., camera 116) may include several distortions including blur, rotation, or skew and background imagery 305. Aspects of the present disclosure discuss techniques for improving quality of a client image including adjusting parameters corresponding to these distortions.

The document 310, as shown, may be a form (e.g., tax form such as a W-2). The document 310 includes a number of elements 320 (e.g., grid elements, boxes, rectangles, etc.). The elements 320 may correspond to areas on the document 310 where textual information may be found. For example, an element 320 may include a label 322 (e.g., text label), which may indicate the type of data (e.g., social security number (SSN)) that is within the element 320. The element 320 may further include a value 324 (e.g., text), which may be the actual value of the textual information (e.g., SSN) included in the element 320. The value 324 may be found within a region 326 (e.g., a text entry area) within the element 320 designated as the location for the value 324. Aspects of the present disclosure identify such elements such as element 320 and regions such as region 326 within a document 310 via segmentation and identify at least labels (e.g., label 322) of the document 310 and formats of corresponding values.

Figure 4:
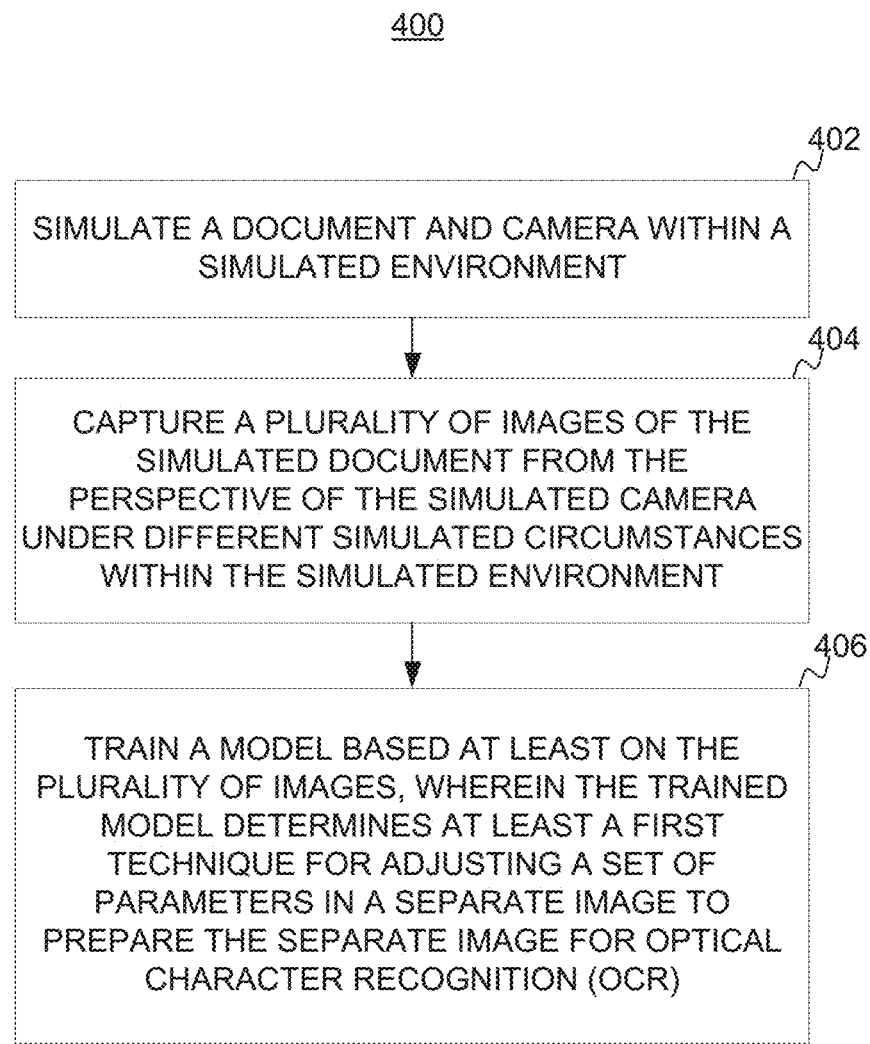
FIG. 4 illustrates example operations for simulating images in order to train a model for identifying information in a document, in accordance with certain aspects of the present disclosure.

FIG. 4 illustrates an example offline (e.g., prior to run-time) process 400 for simulating images in order to train a model for identifying information in a document, in accordance with certain aspects of the present disclosure. Offline process 400 begins at 402, where modeling engine 138 simulates a document and a camera within a simulated environment. In an aspect, the simulated document is a structured or semi-structured document frequently requested for OCR, such as a W-2 tax document. The simulated camera may comprise a function of the rendering engine that determines what would be seen through a particular type of camera disposed at a specific position and in a specific orientation (e.g., pointing in a specific direction) within the 3D simulated environment. The position and orientation may sometimes be referred to collectively as the pose of the simulated camera. The simulated environment may comprise a 3D graphical representation of a real world environment in which a user is likely to capture a photo of a document. For example, the simulated environment may comprise an office with a desk on which the document rests or an outdoor area with foliage and a table on which the document rests. The simulated environment may contain light sources which simulate lighting (e.g., light fixtures, sunlight, moonlight, candlelight, etc.). Lighting within the simulated environment may also cause effects such as shadows and glare.

At 404, modeling engine 138 captures a plurality of images of the simulated document from the perspective of the simulated camera under different combinations of simulated circumstances within the simulated environment. For example, modeling engine 138 may simulate the capture of a series of images of the simulated document, each image being captured from a different simulated camera pose and with a different combination of other simulated circumstances, such as lighting and background. Modeling engine 138 may associate each image with information describing the simulated circumstances of the image (e.g., lighting, background, and camera pose), the type of document (e.g., a W-2 form), and the textual contents of the document. In some embodiments, modeling engine 138 provides the images to reference image bank 136, and in other embodiments, modeling engine 138 provides the images directly to OCR module 134 as reference images so that the computer model may be trained using the images.

At 406, the OCR module trains the computer model (e.g., ML, DL, CNN) based at least on the reference images and the associated information about the reference images. The trained computer model is configured to be used to determine at least one technique for adjusting a set of parameters in a second client image (e.g., that corresponds to a reference image in document type and circumstances) to prepare the image for OCR. For example, the OCR module may train the computer model by determining the best changes to various parameters (e.g., blur, skew, rotation, shadow marks, brightness, contrast, saturation, etc.) for an image of a given document type under a given set of circumstances in order to accurately identify text in the image using OCR.

In an aspect, process 400 is performed multiple times for each of a plurality of different document types (e.g., bill, invoice, standard form, statement, transcript, record, receipt, tax document, etc.) with images of each document being captured under different simulated circumstances in different simulated environments in order to generate a large collection of reference images.

Figure 5:
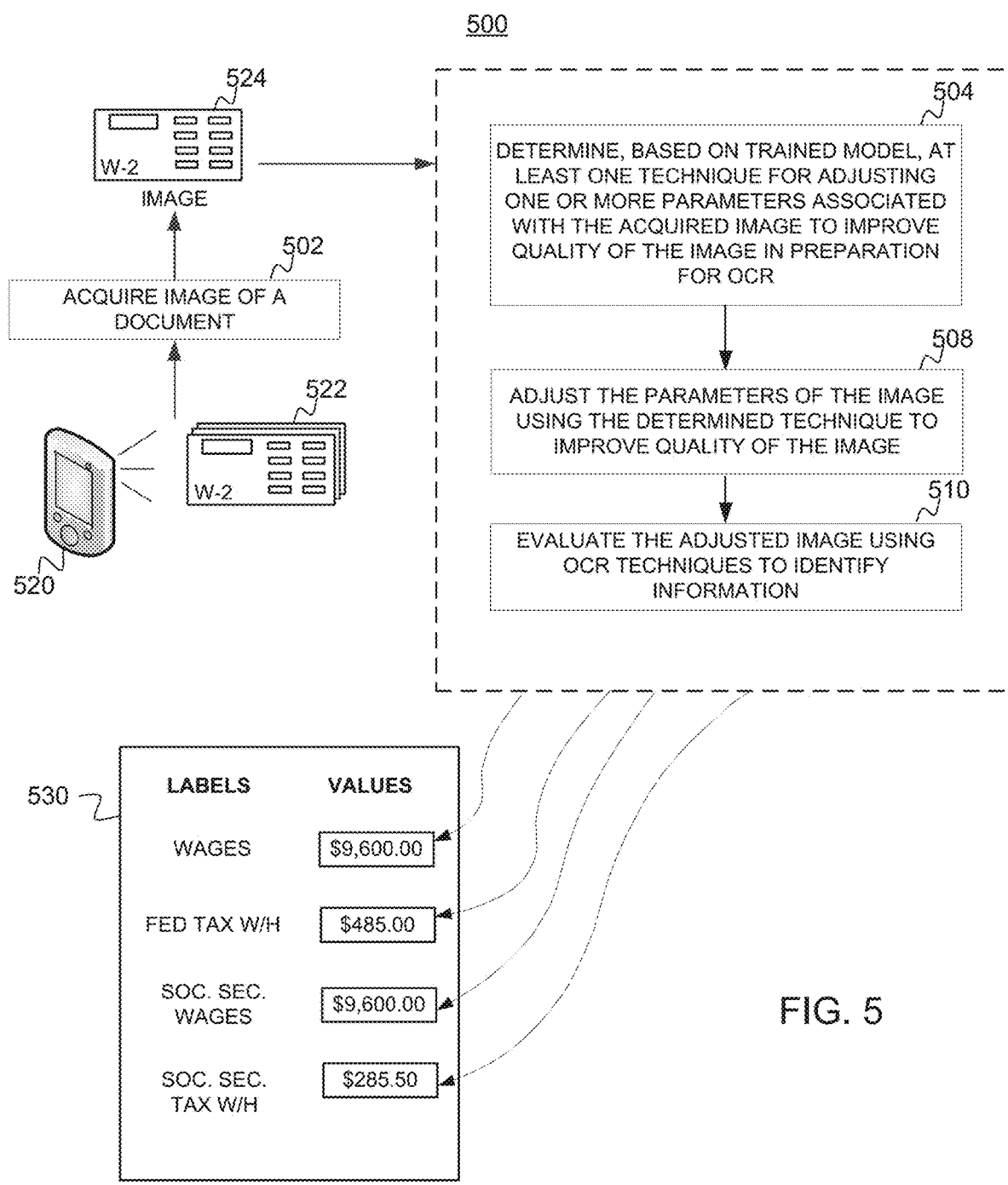
FIG. 5 illustrates example operations performed as part of a process used for identifying information in a document, in accordance with certain aspects of the present disclosure.

FIG. 5 illustrates example operations performed as part of a run-time process 500 used for identifying information in a document, in accordance with certain aspects of the present disclosure.

At 502, an image (e.g., client image) 524 of a candidate document is obtained. In an aspect, the candidate document corresponds to a document whose reference image was used to train the computer model in the offline process of FIG. 4. For example, the candidate document is a semi-structured document such as a W-2 tax document. In an aspect, the image 524 is captured using a camera of a mobile device (e.g. mobile device 520). In an aspect, a user may capture multiple images of the candidate document and may manually select the image 524 from the multiple captured images for further processing.

At 504, based on the trained model of the offline process 400 of FIG. 4, at least one technique is determined for adjusting one or more parameters associated with the acquired image 524 to improve the quality of the image in preparation for OCR. In an aspect, it is also determined how much these parameters are to be adjusted to optimize the client image for OCR.

At 510, the adjusted/optimized client image is evaluated using OCR techniques to identify information from the client image.

In certain aspects, once OCR of the optimized client image is completed, accuracy of the OCR may be determined. For example, an operator may manually check the identified information and confirm if various text/values were accurately identified. If the operator determines that certain information was not accurately identified, the optimized/adjusted client images may be fed back to the computer model to repeat the process of determining parameters, corresponding adjustment values, and techniques for adjustment to improve the OCR. With this feedback loop the computer model may learn how best to optimize certain parameters.

In an aspect, the identified information (e.g., including labels and corresponding obtained values of a W-2 tax document) may be used for further processing of data by one or more applications at a device. For example, the identified labels and values of a candidate W-2 tax document may be used to populate labels and value fields in an interface 530 of a tax preparation application at a mobile device.

Figure 6:
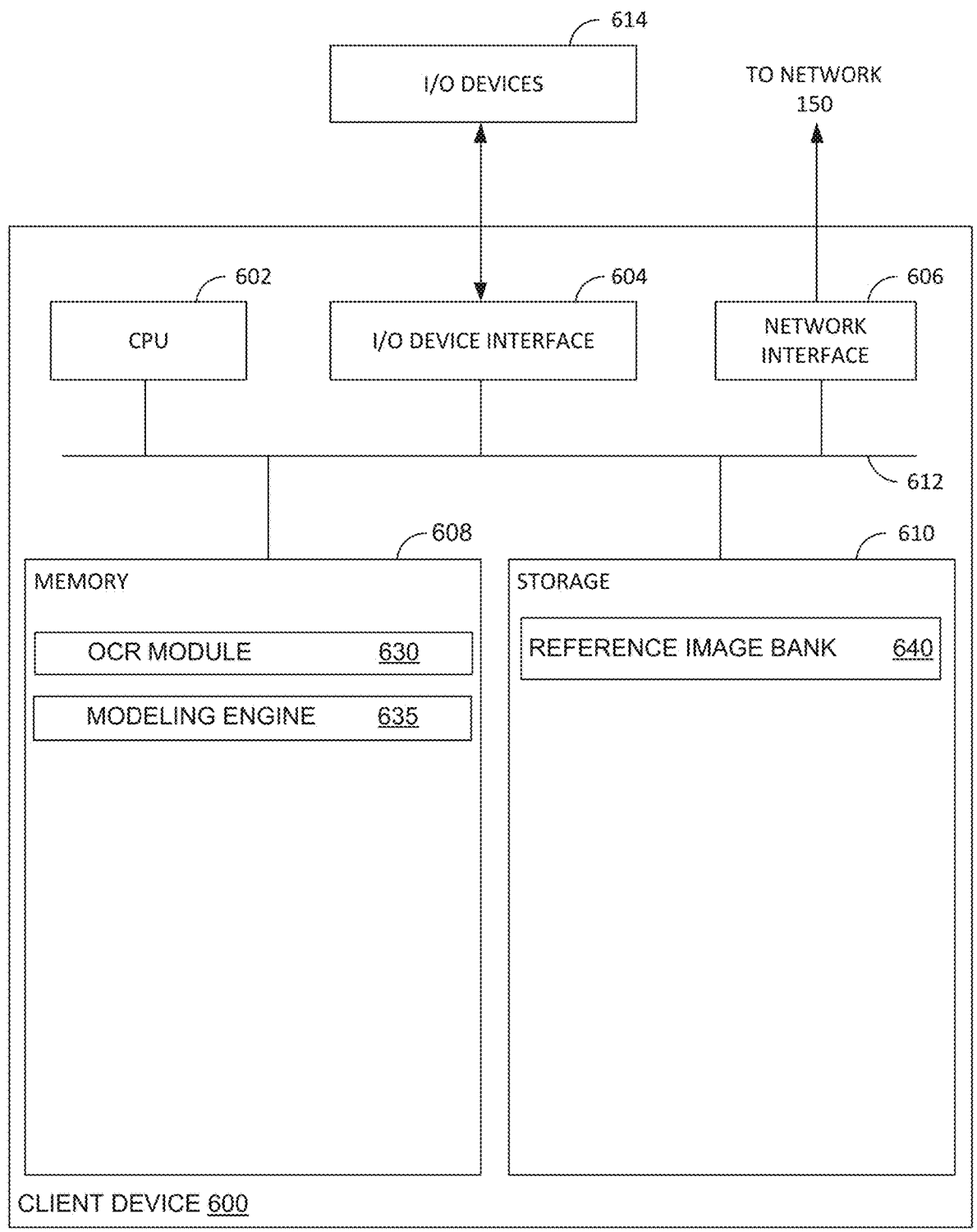
FIG. 6 illustrates an example computing system used for simulating images in order to train a model for identifying information in a document, in accordance with certain aspects of the present disclosure.

FIG. 6 illustrates an example client device 600 by which certain aspects of the present disclosure are implemented. As shown, the client device 600 includes, without limitation, a central processing unit (CPU) 602, one or more I/O device interfaces 604 which may allow for the connection of various I/O devices 814 (e.g., keyboards, displays, mouse devices, pen input, etc.) to client device 600, network interface 606, a memory 608, storage 610, and an interconnect 612. One or more components of client device 600 may be located remotely and accessed via a network.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 generally includes an OCR module 630 and a modeling engine 635. OCR module 630 generally uses reference images (e.g., generated by modeling engine 635) to train a computer model which receives client images and determines appropriate techniques for modifying parameters of the client images in order to optimize the client images for OCR. OCR module 630 optimizes the client images according to the determined techniques, and then performs OCR in order to extract text present in the client images and provide the text for use within client applications. Modeling engine 635 generally simulates the capture of a plurality of images of simulated documents within simulated environments from the perspective of simulated cameras under a variety of simulated circumstances. The images are then used by OCR module 630 as reference images for training the computer model.

As shown, storage 610 includes a reference image bank 640. The reference image bank 640 generally stores reference images for use by OCR module 630 in training the computer model. For example, reference image bank 640 may store images generated by modeling engine 635, images captured by clients in the course of using client applications, and images fed back to reference image bank 640 by OCR module 630 after performing OCR on the images. Reference image bank 640 also stores associated information along with the images, such as information about a document type included in an image, the textual contents of a document, environmental characteristics (e.g., lighting, background, etc.), and the camera pose from which an image was captured. The associated information may also be used by OCR module 630 in training the computer model.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for simulating capturing of images, comprising:
generating a simulated document and a simulated camera using a three-dimensional modeling engine, wherein the simulated document comprises known text;
generating a simulated image of the simulated document from a perspective of the simulated camera;

making an adjustment to a parameter of the simulated image;
extracting text from the simulated image;
making a determination as to whether the adjustment to the parameter resulted in a successful extraction by comparing the text extracted from the simulated image to the known text of the simulated document; and
training a model based at least on the simulated image, the adjustment to the parameter, and the determination, wherein the model is trained to determine at least a first technique for adjusting the parameter in a separate image to facilitate extracting text from the separate image.

2. The computer-implemented method of claim 1, wherein generating the simulated image of the simulated document comprises simulating at least one of: lighting; background; or camera pose.

3. The computer-implemented method of claim 2, wherein the camera pose includes yaw, pitch, roll, or height.

4. The computer-implemented method of claim 1, further comprising:
determining, based on the model, whether a quality of the separate image can be improved to an acceptable level for text extraction, wherein the quality of the separate image is based on one or more of a set of parameters.

5. The computer-implemented method of claim 4, wherein determining whether the quality of the separate image can be improved to an acceptable level comprises determining whether one or more of the set of parameters can be adjusted to corresponding values equal to or above given threshold values associated with the set of parameters.

6. The computer-implemented method of claim 1, further comprising:
performing text extraction on an adjusted separate image to extract information, the adjusted separate image including the separate image after the parameter is adjusted based on the first technique;
determining accuracy of the text extraction; and
feeding back the adjusted separate image into the model to improve accuracy of subsequent text extraction operations.

7. The computer-implemented method of claim 1, wherein the parameter comprises one of: blur, skew, rotation, shadow marks, brightness, contrast, or saturation.

8. A system, comprising:
a processor; and
memory storing instructions which, when executed on one or more processors, performs a method for simulating capturing of images, comprising:
generating a simulated document and a simulated camera using a three-dimensional modeling engine, wherein the simulated document comprises known text;
generating a simulated image of the simulated document from a perspective of the simulated camera;
making an adjustment to a parameter of the simulated image;
extracting text from the simulated image;
making a determination as to whether the adjustment to the parameter resulted in a successful extraction by comparing the text extracted from the simulated image to the known text of the simulated document; and
training a model based at least on the simulated image, the adjustment to the parameter, and the determination, wherein the model is trained to determine at least a first technique for adjusting the parameter in a separate image to facilitate extracting text from the separate image.

9. The system of claim 8, wherein generating the simulated image of the simulated document comprises simulating at least one of: lighting; background; or camera pose.

10. The system of claim 9, wherein the camera pose includes yaw, pitch, roll, or height.

11. The system of claim 8, wherein the method further comprises:
determining, based on the model, whether a quality of the separate image can be improved to an acceptable level for text extraction, wherein the quality of the separate image is based on one or more of a set of parameters.

12. The system of claim 11, wherein determining whether the quality of the separate image can be improved to an acceptable level comprises determining whether one or more of the set of parameters can be adjusted to corresponding values equal to or above given threshold values associated with the set of parameters.

13. The system of claim 8, wherein the method further comprises:
performing text extraction on an adjusted separate image to extract information, the adjusted separate image including the separate image after the parameter is adjusted based on the first technique;
determining accuracy of the text extraction; and
feeding back the adjusted separate image into the model to improve accuracy of subsequent text extraction operations.

14. The system of claim 8, wherein the parameter comprises one of: blur, skew, rotation, shadow marks, brightness, contrast, or saturation.

15. A non-transitory computer-readable medium comprising instructions which, when executed on one or more processors, performs a method for simulating capturing of images, comprising:
generating a simulated document and a simulated camera using a three-dimensional modeling engine, wherein the simulated document comprises known text;
generating a simulated image of the simulated document from a perspective of the simulated camera;
making an adjustment to a parameter of the simulated image;
extracting text from the simulated image;
making a determination as to whether the adjustment to the parameter resulted in a successful extraction by comparing the text extracted from the simulated image to the known text of the simulated document; and
training a model based at least on the simulated image, the adjustment to the parameter, and the determination, wherein the model is trained to determine at least a first technique for adjusting the parameter in a separate image to facilitate extracting text from the separate image.

16. The non-transitory computer-readable medium of claim 15, wherein generating the simulated image of the simulated document comprises simulating at least one of: lighting; background; or camera pose.

17. The non-transitory computer-readable medium of claim 16, wherein the camera pose includes yaw, pitch, roll, or height.

18. The non-transitory computer-readable medium of claim 15, wherein the method further comprises:
determining, based on the model, whether a quality of the separate image can be improved to an acceptable level for text extraction, wherein the quality of the separate image is based on one or more of a set of parameters.

19. The non-transitory computer-readable medium of claim 18, wherein determining whether the quality of the separate image can be improved to an acceptable level comprises determining whether one or more of the set of parameters can be adjusted to corresponding values equal to or above given threshold values associated with the set of parameters.

20. The non-transitory computer-readable medium of claim 15, wherein the method further comprises:
- performing text extraction on an adjusted separate image to extract information, the adjusted separate image including the separate image after the parameter is adjusted based on the first technique;
- determining accuracy of the text extraction; and
- feeding back the adjusted separate image into the model to improve accuracy of subsequent text extraction operations.

* * * * *